May 27, 1969     D. P. WILTERINK     3,446,004
WELTING CORD
Filed Oct. 13, 1967

INVENTOR.
DALE P. WILTERINK
BY
ATTORNEYS

United States Patent Office 3,446,004
Patented May 27, 1969

3,446,004
WELTING CORD
Dale P. Wilterink, Anaheim, Calif., assignor to Sackner Products, Inc., Grand Rapids, Mich.
Filed Oct. 13, 1967, Ser. No. 675,755
Int. Cl. D02g 3/36, 3/06, 3/08
U.S. Cl. 57—149                  6 Claims

ABSTRACT OF THE DISCLOSURE

This disclosure relates to a welting cord comprising an inner core of crimped cellulose tissue crumpled traversely into an elongated, cylindrical, resilient body and wrapped with filaments so as to form an outer layer or jacket. The filament can be coated with a thermoplastic adhesive material which can be used in bonding the welting cord to fabric for making boxing material. The filaments can alternately be a solid thermoplastic material which, when heated, forms an adhesive and bonds to fabric for the making of boxing and the like.

---

This invention relates to a welting cord comprising a strip of crimped cellulose tissue crumpled traversely into an elongated, substantially cylindrical, resilient body and an outer layer of filaments wrapped around the cellulose tissue so as to form an outer surface, the filaments containing at least an outer layer of a thermoplastic adhesive integrally formed with the filaments.

McGrath et al., 3,143,456 discloses a cord for boxing, wherein the cord of twisted or braided cellulose has a thermoplastic adhesive applied to high spots on the cord.

Cook, 2,557,343, discloses a packing cord and the like with a cellulose core and with an outer layer of wound glass filament coated with microcystalline wax.

I have now discovered an improved welting cord which has wrapped around it a plurality of filaments containing a thermoplastic adhesive in a continuous layer on the surface of the filaments. The filaments can be precoated with the thermoplastic adhesive prior to being wrapped around the cord, or the filaments can be wholly made from the thermoplastic material.

By various aspects of this invention one or more of the following, or other, objects can be obtained.

It is an object of this invention to provide a novel welting cord for use in the manufacture of boxing for cushions and the like.

It is a further object of this invention to provide novel boxing material employing a novel packing cord wherein the material is adhered to the welting cord without relative inflexibility due to the glue and bleed-through of the glue is eliminated.

Other aspects, objects, and the several advantages of this invention are apparent to one skilled in the art from a study of this disclosure, the drawings, and the appended claims.

According to the invention there is provided a novel welting cord comprising a strip of crimped cellulose tissue crimpled traversely into an elongated, substantially cylindrical, resilient body, having a number of filaments wrapped around the cellulose tissue, at least one or more of the filaments containing a continuous outer layer of thermoplastic adhesive. The thermoplastic adhesive layer can be coated onto a rayon or nylon filament, for example, or can be part of a solid filament of the thermoplastic adhesive.

The thermoplastic adhesive material can be any suitable material which, when heated, will become tacky or sticky and will adhere to cloth or fabric employed in the manufacture of boxing for cushions and the like. Suitable thermoplastic material include low density polyethylene, polypropylene, polybutene-1 and copolymers thereof, polyvinyl chloride, polyvinylidene chloride, and copolymers thereof alone or with other materials. Preferably, the melting point of the adhesive will be in the range of 150 to 300°, preferably above 200° F.

If the thermoplastic material is coated onto the core of a non-adhesive filament, the filament core can be rayon, cotton, nylon, polyester, and the like.

The invention will now be described with reference to the accompanying drawings in which.

Figure 1:
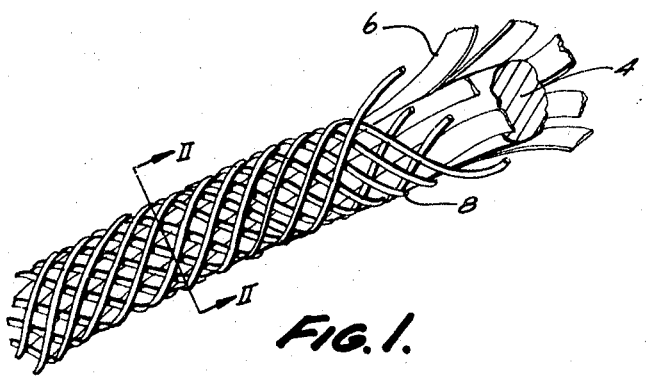
FIG. 1 is a perspective view of a novel welting cord according to the invention.
Figure 2:
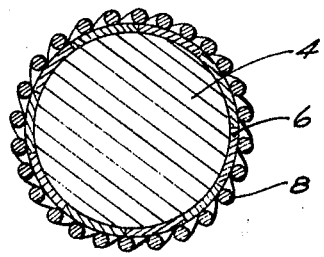
FIG. 2 is a sectional view through lines II—II of FIG. 1.

Referring now to the drawings, the welting cord contains an inner core 2 of crumpled cellulose or similar material. An outer lay 4 of cellulose material is wrapped around the crinkled and crimped core 2. The core is bound together through wound or woven filaments 6 forming an open mesh structure. The filaments contain a continuous layer of a thermoplastic adhesive which when heated, will adhere to the cellulose outer layer 4 and to other filaments as well as to cloth material employed in the making of boxing material. The open mesh structure of the filaments provides a plurality of contact points for adhering the cord to the fabric, since the glue is thinly spread over the surface of the cord, the cord remains flexible and the glue will not "bleed through" the material. The open mesh structure is thus important for flexibility as well as prevention of "bleed through" of the thermoplastic material.

Further, if the melting temperature of the thermoplastic adhesive is above 150 or 200° F., the adhesive will not bleed through the fabric under normal storage conditions.

The coated cord or cords can be introduced into a braid pattern by the use of braiding machine center posts which serve to put the coated strand or strands underneath the normal maypole braiding pattern.

Specific example

A rayon thread is thinly coated with a mixture of two parts Franklin low temperature, hot melt adhesive #4270 and one part H. B. Fuller synthetic resin #4078. The mixture of these adhesives is a thermoplastic resin containing a copolymer of ethylene and modified by natural and synthetic resin esters. The coated rayon is braided around a core of longitudinally crumpled cellulose in an open weave pattern to make a welting cord. The cord is completely flexible and does not stick to the roll or to material at normal temperatures.

Figure 3:
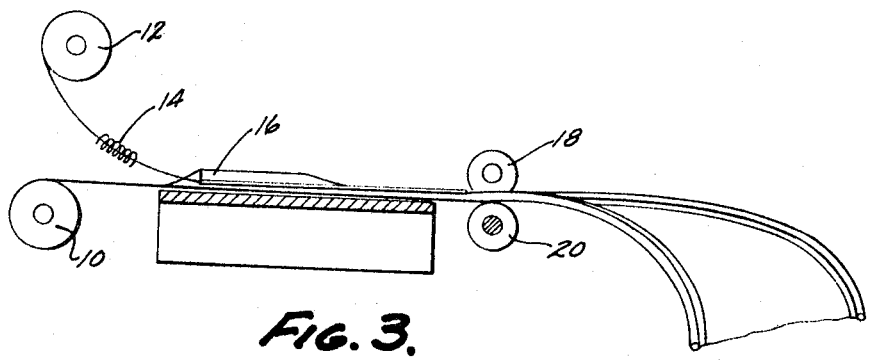
FIG. 3 is a schematic representation of a process of making boxing using the welting cord shown in FIGS. 1 and 2.

With reference now to FIG. 3, there is schematically shown how the welting cord is employed in making a boxing strip. Material from roll 10 and the welting cord from roll 12 are fed simultaneously to a boxing machine. The cord is heated in heater wire 14 and positioned on the material which is folded over the cord with a curved arm 16. Rolls 18 and 20 press the material against the heated cord to form an adhesive bond therebetween. The heating is sufficient to soften the coated adhesive on the welting cord to a degree sufficient to permit the welting cord to adhere to the material. The boxing material thus produced is entirely flexible at the fold and there are no hard spots on the folded material due to glue accumulation.

The cord can be manufactured in round, half-oval, or other shapes for subsequent covering with fabric or other materials and can also be used as a single or multiple (side-by-side) trim welt.

Reasonable variation and modification are possible within the scope of the foregoing disclosure, the drawings, and the appended claims to the invention without departing from the spirit thereof.

I claim:
1. An article of manufacture comprising a strip of crimped cellulose tissue crumpled traversely into an elongated, substantially cylindrical, resilient body and a number of filaments forming an open mesh layer wrapped around the resilient body, at least some of said filaments having at least an outer continuous layer of a thermoplastic adhesive.
2. An article according to claim 1, wherein a layer of cellulose tissue surrounds the cylindrical, resilient body and is positioned beneath the layer of filaments.
3. An article according to claim 1, wherein said filaments contain a uniform coating of said thermoplastic adhesive material.
4. An article according to claim 1, wherein said filaments are a solid filament of said thermoplastic adhesive material.
5. An article according to claim 1, wherein said thermoplastic adhesive material is selected from the group consisting of polyethylene, polypropylene, polybutene-1 and copolymers thereof, polyvinyl chloride, polyvinylidene chloride and copolymers thereof.
6. An article of manufacture according to claim 1, wherein said filament comprises a rayon thread coated with a uniform layer of a thermoplastic resin comprising a copolymer of ethylene modified by natural and synthetic resin esters.

References Cited
UNITED STATES PATENTS

| | | | |
|---|---|---|---|
| 2,250,776 | 7/1941 | Sackner | 57—149 |
| 2,503,791 | 4/1950 | Boersma | 87—6 |
| 2,722,861 | 11/1955 | Francis | 87—1 |
| 2,974,559 | 3/1961 | Coggi | 57—140 XR |
| 3,089,379 | 5/1963 | Finor et al. | 57—149 XR |

DONALD E. WATKINS, *Primary Examiner.*

U.S. Cl. X.R.

57—150; 87—1